United States Patent [19]
Braun

[11] Patent Number: 4,701,264
[45] Date of Patent: * Oct. 20, 1987

[54] PROCESS FOR FLOCCULATING TACONITE TAILINGS

[75] Inventor: David B. Braun, Ridgefield, Conn.

[73] Assignee: Union Carbide Corporation, Danbury, Conn.

[*] Notice: The portion of the term of this patent subsequent to Jun. 5, 2001 has been disclaimed.

[21] Appl. No.: 730,957

[22] Filed: May 6, 1985

Related U.S. Application Data

[63] Continuation of Ser. No. 508,412, Jun. 28, 1983, abandoned, which is a continuation of Ser. No. 320,493, Nov. 12, 1981, abandoned.

[51] Int. Cl.$^4$ ................................. C02F 1/56
[52] U.S. Cl. ........................... 210/734; 209/5; 210/907
[58] Field of Search ............... 209/5; 210/725, 727, 210/728, 733, 734, 907; 524/801

[56] References Cited

U.S. PATENT DOCUMENTS

| | | | |
|---|---|---|---|
| 3,418,237 | 12/1968 | Booth | 210/907 |
| 3,479,282 | 11/1969 | Chamot | 210/734 |
| 3,624,019 | 11/1971 | Anderson | 210/734 |
| 3,776,892 | 12/1973 | Bleyle | 210/734 |
| 3,899,471 | 8/1975 | Lorenz | 210/734 |
| 3,956,122 | 5/1976 | Coscia | 210/734 |
| 3,968,037 | 7/1976 | Morgan | 210/734 |
| 4,125,508 | 11/1978 | Elfers | 210/734 |
| 4,137,164 | 1/1979 | Coscia | 210/734 |
| 4,147,681 | 4/1979 | Lim | 210/734 |
| 4,179,370 | 12/1979 | Hubner | 210/734 |
| 4,274,945 | 6/1981 | Goodman | 210/734 |
| 4,330,450 | 5/1982 | Lipowski | 210/733 |
| 4,452,940 | 6/1984 | Rosen | 524/801 |
| 4,485,209 | 11/1984 | Fan | 524/801 |
| 4,529,782 | 7/1985 | Fan | 526/259 |
| 4,555,346 | 11/1985 | Rosen | 210/734 |

Primary Examiner—Ernest G. Therkorn
Attorney, Agent, or Firm—Henry H. Gibson

[57] ABSTRACT

Described herein is a process for flocculating taconite tailings which comprises (a) forming a concentrated aqueous solution from a water-soluble ter- or higher polymer water-in oil emulsion, (b) diluting said concentrated aqueous solution of ter- or higher polymer formed in step (a) with additional water, (c) mixing the diluted solution of (b) with taconite tailings under appropriate floc forming conditions and (d) allowing the suspended solids to settle to form an essentially clear aqueous supernatant.

8 Claims, No Drawings

PROCESS FOR FLOCCULATING TACONITE TAILINGS

This application is a continuation of prior U.S. application Ser. No. 508,412, filing data June 28, 1983, which is a continuation of application Ser. No. 320,493, filing date Nov. 12, 1981, both now abandoned.

This invention is directed to a process for flocculating toconite tailings. The process comprises adding an aqueous solution of a water soluble ter- or higher polymer to a taconite tailing under floc forming conditions and thereafter allowing the suspended solids to settle from the suspension to provide an essentially clear aqueous supernatant.

Taconite tailings are a by-product of the beneficiation of iron ore. The beneficiation process involves dry and wet grinding of the ore to obtain small particles followed by separation of the iron bearing minerals. The separation of the iron bearing minerals leaves behind a dilute aqueous slurry containing principally silica and ilmenite ($FeTiO_3$) as well as smaller amounts of clay and other minerals. The particles in the slurry settle very slowly. In order to speed the settling of the particles, cationic flocculants are widely used in combination with mechanical thickeners. However, the cationic flocculants tend to produce small flocs which do not settle as fast as is sometimes desired and do not compact into a high density, high solids content sediment which is sometimes desirable for the most efficient operation of the mechanical thickeners.

Thus, a need exists to develop a process whereby a slurry containing taconite tailings can be flocculated to produce faster settling rates and higher sediment solids content.

THE INVENTION

This invention is directed to a process for flocculating taconite tailings which comprise (a) forming a concentrated aqueous solution from a water soluble ter- or higher polymer water-in-oil emulsion, (b) diluting said concentrated aqueous solution of ter- or higher polymer formed in step (a) with additional water, (c) mixing the diluted solution of (b) with taconite tailings under appropriate floc forming conditions and (d) allowing the suspended solids to settle to form an essentially clear aqueous supernatant.

The concentrated aqueous solution formed from the water-soluble ter- or higher polymer water-in-oil emulsion contains from about 0.15 to about 9.0 weight percent, preferably from about 0.30 to about 6.0 weight percent of polymer; said weight percent based on the total weight of the emulsion.

The concentrated aqueous solution is then further diluted with water. The diluted solution then contains from about 0.0003 to about 0.3 weight percent, preferably from about 0.0006 to about 0.015 weight percent of polymer, said weight percent based on the total weight of the emulsion.

The diluted solution is mixed in whole or in part with the taconite tailings. The solution may be mixed with the taconite tailings at one or more addition points. The flow rate of diluted flocculant solution is adjusted to achieve an effective flocculant dosage which is measured in parts by weight of polymer per million parts by weight of taconite tailings.

The floc forming conditions include appropriate choice of flocculant dosage, concentration of dilute flocculant solution, selection of acceptable mixing energy to achieve desirably large size flocs and appropriate contact between flocculant solution and taconite tailings.

Upon addition of the diluted flocculant solution under the floc forming conditions, rapid settling of suspended solids begins to occur. With time the concentration of suspended solids in the sediment increases significantly and an essentially clear supernatant results.

The ter- or higher polymers are prepared by water-in-oil polymerization processes which are well known in the art. Preferably the ter- or higher polymers are produced by the process as described in U.S. Pat. No. 4,485,209 (Fan et al.) issued Nov. 27, 1984 filed in the names of Y. Fan et al titled "A Process For Producing a Polymer Water-In-Oil Emulsion" and filed on Sept. 14, 1981. In said U.S. Pat. No. 4,485,209 (Fan et al.) a semi-continuous process for producing a polymer water-in-oil emulsion is described which process comprises:

(a) combining: (i) an aqueous solution comprising at least one water-soluble monomer, and (ii) a mixture comprising a hydrophobic liquid, a hydrophobic monomer and an oil-soluble surfactant:

(b) homogenizing the mixture from (a) to form a water-in-oil emulsion;

(c) deoxygenating said homogenized water-in-oil emulsion;

(d) continually adding the homogenized water-in-oil emulsion to a reactor while adding thereto a deoxygenated initiator solution;

(e) heating the mixture from (d) under polymerization conditions so as to form a polymer water-in-oil emulsion; and (f) recovering a polymer water-in-oil emulsion.

A water-soluble surfactant is generally added to the recovered water-in-oil emulsion (f). These water-in-oil emulsions are mixed with water to form an oil-in-water emulsion which liberates the polymer formerly occupying the internal phase of the water-in-oil emulsion.

In the first step of the process, an aqueous solution containing at least one water-soluble monomer is combined with a mixture containing a hydrophobic liquid, a hydrophobic monomer and an oil-soluble surfactant. This combination of materials is homogenized to form a water-in-oil emulsion.

The aqueous solution contains a mixture of water soluble monomers. These monomers have a water solubility of at least 5 weight percent and include acrylamide, methacrylamide, acrylic acid, methacrylic acid, vinyl sulfonic acid, 2-acrylamido-2-methylpropanesulfonic acid and their alkali metal salts, aminoalkyl acrylate, aminoalkyl methacrylate, dialkylaminoalkyl acrylate, dialkylamino methacrylate and their quarternized salts with dimethyl sulfate or methyl chloride, vinyl benzyl dimethyl ammonium chloride, alkali metal and ammonium salts of 2-sulfoethylacrylate, alkali metal and ammonium salts of vinyl benzyl sulfonates, maleic anhydride, acrolein, N-vinyl pyrolidane, and the like. The preferred monomers are acrylamide and acrylic acid.

If acrylic acid is used as a monomer it is reacted with a base, preferably with an equivalent amount of base, such as sodium hydroxide, so that the sodium acrylate solution has a pH of from about 5.0 to about 10.0, preferably from about 6.5 to about 8.5, depending on the type and amount of base employed. This solution is combined with another water soluble monomer, such as acrylamide, and then with water to form the aqueous phase.

The aqueous phase comprises from about 65 to about 80, preferably from about 70 to about 78 weight percent of the total composition.

The mixture which is combined with the aqueous solution containing the water-soluble monomers contains a hydrophobic liquid, a hydrophobic monomer and an oil-soluble surfactant.

The hydrophobic liquids suitable for use herein include dodecanes, hexadecanes, benzene, xylene, toluene, mineral oils, kerosenes, petroleum, and mixtures thereof. A preferred hydrophobic liquid is Isopar M (sold by Exxon).

The hydrophobic monomer(s) which may be used in this invention have a water solubility of less than 5 weight percent and include one or more of vinyl esters, such as vinyl acetate, alkyl acrylates, such as ethylacrylate, alkyl methacrylates such as methyl methacrylate, vinyl ethers such as butylvinyl ether, acrylonitrile, styrene and its derivatives, such as 2-methylstyrene, N-vinyl carbazole, and the like.

The surfactants suitable for use herein are usually of the oil-soluble type having a Hydrophile-Lipopnile Balance (HLB) value of from about 1 to about 10, preferably from about 2 to about 6. These surfactants are normally referred to as the water-in-oil type. The surfactants include fatty acid esters, such as sorbitan monolaurate, sorbitan monstearate, sorbitan monooleate, sorbitan trioleate, mono and diglycerides, such as mono and diglycerides obtained from the glycerolysis of edible fats, polyoxyethylenated fatty acid esters, such as polyoxyethylenated (4) sorbitan monostearate, polyoxyethylenated linear alcohols, such as Tergitol 15-S-3 and Tergitol 25-L-3 (both supplied by Union Carbide Corp.), polyoxyethylene sorbitol esters, such as polyoxyethylene sorbitol beeswax derivative, polyoxyethylenated alcohols such as polyoxyethylenated (2) cetyl ether, ad the like.

The mixture of the aqueous phase and oil phase contains from about 15 to about 50, preferably from about 29 to about 40 weight percent of the hydrophobic liquid and hydrophobic monomer(s), based on the total weight of the composition.

The aqueous solution (i) containing the water-soluble monomers is combined with the mixture containing a hydrophobic liquid, a hydrophobic monomer(s) and an oil-soluble surfactant. This mixture is homogenized to form a water-in-oil emulsion. Homogenization takes place by subjecting the mixture to high shear mixing techniques which are generally well-known in the art. These include the use of homogenizers, high speed mixers and any other techniques for obtaining high shear mixing. The homogenization is carried out at a temperature of from about 10° to about 40° C., preferably from about 15° to 25° C. The homogenization may be carried out either continuously or in a batch process.

The emulsions so prepared have a rather narrow particle size distribution. The diameters of the majority of the particles range from about 0.2 to about 5.0 microns, preferably from about 1 to 3 microns.

The water-in-oil emulsion so produced comprises:

(a) An aqueous phase comprising from about 45 to about 80, preferably from about 48 to about 78 weight percent and containing water-soluble monomer(s) wherein the monomers constitute from about 20 to about 60, preferably from about 30 to about 50 weight percent;

(b) a hydrophobic liquid and hydrophobic monomer(s) comprising from about 15 to about 50, preferably from about 20 to about 40 weight percent;

(c) an oil-soluble surfactant comprising from about 0.1 to about 5, preferably from about 1 to about 3 weight percent.

After forming the water-in-oil emulsion, it is generally deoxgenated, by for example, subjecting the emulsion to a vacuum of from about 50 to about 500, preferably from about 100 to about 200 mm of mercury under an inert gas atmosphere at a temperature of from about 10° to about 40° C., either continuously or as a batch process.

A reactor is continuously charged with the deoxygenated water-in-oidl emulsion. Preferably, an initial charge of between about 20 to about 50 percent of the deoxygenated emulsion is added to the reactor. Most preferably, the reactor is charged with an amount of deoxygenated water in-oil emulsion so as to cover the agitator blades therein. The amount charged to the reactor depends on the geometry and size of the reactor.

Also, a catalyst or initiator useful in polymerizing ethylenically unsaturated monomers is added to the reactor. These catalysts include one or more azo and/or peroxide containing compounds, such as t-butyl hydroperoxide, t-butyl perbenzoate, benzoyl peroxide, ammonium persulfate, cumene hydroperoxide, 2,2'-azobis-(isobutyronitrile), 2,2'-azobis(2,4-dimethylveloronitrile), redox catalysts, and other known in the art. These catalysts are added to the reactor either directly or in the form of a solution, i.e., the catalyst is dissolved in a solvent, such as a hydrocarbon liquid, i.e., toluene. The catalyst solution contains from about 1 to about 10, preferably from about 3 to about 6 weight percent of the catalyst.

From about 1 to about 99, preferably from about 20 to about 60 percent of the catalyst solution is initially added to the reactor containing the water-in-oil emulsion.

The remaining water-in-oil emulsion and catalyst solution are then continually fed into the reactor.

The polymerization is carried out at a temperature of from about 30° to about 70° C., preferably from about 40° to about 55° C., most preferably from about 48° to about 52° C., for about 1 to about 10 hours, preferably from about 2 to about 9 hours. The reaction time depending on the size of the reactor and the polymerization conditions.

The polymerization is generally carried out at atmospheric pressure, although subatmospheric and superatmospheric pressures may be used. The polymerization is preferably carried out under an inert atmosphere, such as a helium, argon or nitrogen.

The polymerization reaction generates considerable heat which must be removed. Generally, the heat is dissipated by normal cooling facilities.

The polymerization reaction rate may be controlled by the introduction of small quantities of air (atmospheric air and/or oxygen) into the reaction. The air may be introduced, i.e., sparged, either intermittently or continously into the reactor to control the reaction temperature. When a continuous air sparging is employed, the amount of oxygen in the reaction medium must be carefully controlled so as to achieve the desired rate of polymerization. An oxygen content of from about 0.01 to about 1.0, preferably from about 0.02 to about 0.50 parts per million is desirable. When the air is introduced intermittently, a flow rate of from about 0.01 to about 1.0, preferably from about 0.05 to about 0.5 cubic inches per minute, per pound of reactor charge is desirable. The duration of air injection may vary from a fraction of a second to a few seconds, and it may be repeated as many times as necessary until a desired rate of polymerization is achieved.

After the polymerization is complete, an antioxidant may added to the reaction mass. Any organic antioxidant suitable for the inhibition of free radical reactions may be used. The antioxidant is generally dissolved in a suitable solvent. The preferred antioxidants include substituted phenols, such as Ionol, thiobisphenol, such as Santonox-R, and hydroquinone derivatives, such as the monomethyl ether of hydroquinine. The suitable solvents include toluene, benzene, xylene, diethyl ether, methyl acetate, and the like. The antioxidant is present in the solution in amounts of from about 1 to about 30, preferably from about 5 to about 10 percent.

The antioxidant solution is added to the reaction mass in amounts of from about 0.05 to about .5 parts per hundred parts of resin.

Addition of the antioxidant may be commenced either at the end of the polymerization or after the reaction mixture has been cooled to ambient temperature.

The reaction mass is generally cooled to about 25° C. and the polymer water-in-oil emulsion recovered.

The polymer water-in-oil emulsion is described in U.S. Pat. No. 4,452,490 (Chu et al.) issued June 5, 1984, filed in the names of N. Chu et al, titled "Polymer Water-In-Oil Emulsions", and filed on Sept. 14, 1981.

The polymer water-in-oil emulsion as described in said U.S. Pat. No. 4,452,940 (Chu et al.) comprises:

(a) an aqueous phase constituting from about 60 to about 80, preferably from about 68 to about 78 weight percent, and containing therein from about 30 to about 70, preferably from about 35 to about 55 weight percent of polymer and from about 30 to about 70, preferably from about 45 to about 65 weight percent of water;

(b) a hydrophobic liquid constituting from about 15 to about 50, preferably from about 19 to about 31 weight percent, and (c) an oil-soluble surfactant constituting from about 0.5 to about 5, preferable from about 1 to about 3 weight percent, said weight percents based on the total weight of the emulsion.

The polymers produced have an intrinsic viscosity of from about 2 to about 40, preferably from about 10 to about 35, and most preferably from about 15 to about 20 dl/g as measured in a one normal aqueous sodium chloride solution at 25° C.

The preferred terpolymers are acrylamide containing terpolymrs having an intrinsic viscosity of at least about 15 dl/g. There are described in U.S. patent application Ser. No. 302,110 abandoned and refiled Nov. 17, 1983 as application Ser. No. 552,735, now U.S. Pat. No. 4,529,782 (Fan et al.) filed in the names of Y. Fan et al, titled "High Molecular Weight Water Soluble Polymers" and filed on Sept. 14, 1981.

The acrylamide containing polymers in said U.S. Pat. No. 4,529,782 (Fan et al.) are of the following formula:

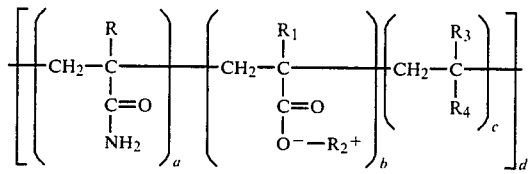

ps wherein R, $R_1$ and $R_3$ are independently hydrogen or methyl, $R_2^+$ is an alkali metal ion, such as $Na^+$ or $K^+$, $R_4$ is $OR_5$, where $R_5$ is an alkyl group having up to 5 carbon atoms,

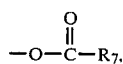

wherein $R_7$ is either methyl or ethyl,

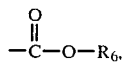

phenyl substituted phenyl, CN, or

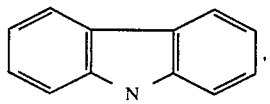

and $R_6$ is an alkyl group having up to 8 carbon atoms, wherein (a) is from 5 to about 90, preferably from about 30 to about 60 percent, (b) is from 5 to about 90, preferably from about 30 to about 60 percent, (c) is from about 0.2 to about 20, preferably from about 1 to about 10 percent, and (d) is an integer of from about 1,000 to about 1,000,000.

Under certain conditions, the alkoxy or acyloxy groups in the polymer may be partially hydrolyzed to the corresponding alcohol group and yield a tetrapolymer of the following general formula:

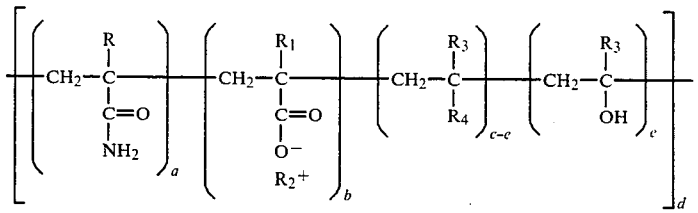

wherein R, $R_1$, $R_2^+$, $R_3$, $R_4$, a, b, c, and d are as previously defined and e is from about 0.1 to about 20 percent;

The preferred polymers are terpolymers of the following formula:

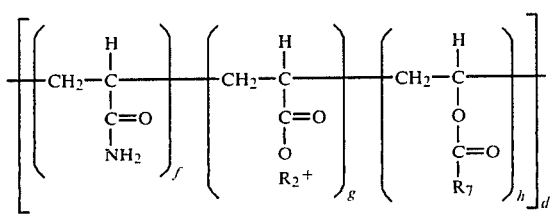

wherein $R_2^+$ is $Na^+$ or $K^+$, $R_7$ is methyl, ethyl, or butyl, and f is from about 5 to about 90, preferably from about 30 to about 60 percent, g is from about 5 to 90, preferably from about 30 to 60 percent h is from about 0.2 to about 20 percent, and d is as previously defined.

The preferred tetrapolymers are of the following formula:

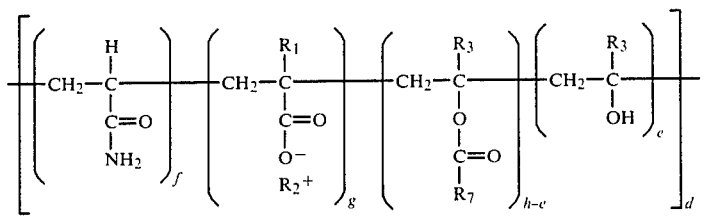

wherein $R_1$, $R_2^+$, $R_3$, $R_7$, f, g, h, d and e are as previous defined.

After the water-in-oil emulsion is prepared, a water-soluble inverting surfactant may be added therto. The surfactants which may be used include polyoxyethylene alkyl phenol, polyoxyethylene (10 mole) cetyl ether, polyoxyethylene alkyl-aryl ether, quaternary ammonium derivatives, potassium oleate, N-cetyl N-ethyl morpholinium ethosulfate, sodium lauryl sulfate, condensation products of higher fatty alcohols with ethylene oxide, such as the reaction product of oleyl alcohol with 10 ethylene oxide units; condensation products of alkylphenols and ethylene oxide, such as the reaction products of isooctylphenol with 12 ethylene oxide units; condensation products of higher fatty acid amines with five, or more, ethylene oxide units; ethylene oxide condensation products of polyhydric alcohol partial higher fatty esters, and their inner anhydrides (mannitolanhydride, called Mannitan, and sorbitol-anhydride, called Sorbitan). The preferred surfactants are ethoxylated nonyl phenols, ethoxylated nonyl phenol formaldehyde resins, and the like.

The inverting surfactant is used in amounts of from about 0.1 to about 20, preferably from about 1 to about 10 parts per one hundred parts of the polymer.

The water-in-oil emulsion containing the inverting surfactant is then inverted in the presence of water as described above.

EXAMPLES

The following examples serve to give specific illustrations of the practice of this invention but they are not intended in any way to limit the scope of this invention.

In the following Examples the designations are used:
Anionic Polymer 1—an acrylamide/sodium acrylate/ethyl acrylate terpolymer. (The terpolymer contained 55 mole percent of acrylamide, 32.5 mole percent of sodium acrylate and 12.5 mole percent of ethyl acrylate. The terpolymer had an intrinsic viscosity of 16 dl/g as measured in a one normal aqueous NaCl solution at 25° C.)

Anionic Polymer 2—an acrylamide/sodium acrylate/vinylacetate terpolymer. (The terpolymer contained 54 mole percent of acrylamide, 41 mole percent of sodium acrylate and 5 mole percent of vinylacetate. The terpolymer had an intrinsic viscosity of 14 dl/g measured in a one normal aqueous sodium chloride solution at 25° C.

Anionic Polymer 3—an acrylamide/sodium acrylate/vinylacetate terpolymer. The terpolymer contains 54 mole-% of acrylamide, 41 mole-% of sodium acrylate and 5 mole-% of vinylacetate and had an intrinsic viscosity of 19 dl/g as measured in a one normal aqueous NaCl solution at 25° C.).

Cationic Polymer 1—poly(diallyl dimethyl ammonium chloride) [Calgon Catfloc M-502, sold by Calgon Corporation].

The following procedure was employed in adding the flocculant(s) to the aqueous slurry and testing the resultant slurry for initial settling rate, supernatant clarity, and underflow solids content.

Cylinder Settling Tests were used in the Examples. In this test a 1-liter glass cylinder was filled with 1000 ml of taconite tailing. A 0.01 wt. % solution of the flocculant was added in two equal increments. The cylinder was inverted 5 times after addition of each increment. Then a stopwatch was started. A piece of narrow masking tape ws affixed vertically to the outside of the cylinder and the starting height of the tailing sample was marked on the masking tape. The height of the interface between clear supernatant and the settling solids was marked on the tape at 1.0 min. intervals for 8 minutes. At 2.0, 5.0 and 8.0 min. after the start of the test a Brinkman Probe Colorimeter was used to measure the % Transmittance (clarity) of the supernatant.

Initial Settling Rate $t_{70}$

The term $t_{70}$ is defined as the time required for the interface between supernatant and sediment to move to 70% of the original height of the sample in the cylinder. This time, in seconds, was determined in the tests by plotting the height of the interface vs. time on rectangular coordinate graph paper, then reading the time to reach 70% of the original height from this graph.

% Transmittance at 5 minutes

As noted above % transmittance is measured at 2, 5 and 8 minutes after the start of the test. The following relationship exists between the % transmittance, T, and the time when the transmittance was measured t.

$$T = bt^m \tag{1}$$

or:

$$\ln T = m(\ln t) + \ln b \tag{2}$$

Linear regression analysis was used to calculate the statistically best value of T at t=5 min., which is designated $T_5$.

Underflow Solids Content-$S_5$

This technique includes one important assumption: all the solids in the original tailing sample as in the sediment after the test is complete.

To calculate the underflow solids content using this assumption we proceeded as follows:

$$S = \frac{AB}{100} \quad (3)$$

where:
S=the wt. % of solids in the cylinder in grams.
A=Solids content of tailing sample in wt. %.
B=Weight of the tailing sample in grams.
Then:

$$D = B - S \quad (4)$$

Where:
D=weight of water in the cylinder in grams.
And:

$$F = (H_o - H_5)C \quad (5)$$

Where:
F=weight of supernatant water in grams
$H_o$=original height of sample in the cylinder in inches
$H_5$=the height of sediment in the cylinder 5 minutes after the start of the test in inches.
C=the cylinder constant in gms of water/inch.
Therefore:

$$W = D - F \quad (6)$$

Where:
W=the weight of water in the sediment in grams.
And:

$$S_5 = \frac{S}{W + S} \times 100 \quad (7)$$

Where:
$S_5$=wt. % solids in the sediment 5 minutes after the start of the test.
Or, by combining equations (3) to (6):

$$S_5 = \frac{AB}{B - (H_o - H_t)C} \quad (8)$$

Control A

The initial settling rate, percent transmittance and underflow solids content of an aqueous slurry of taconite tailings was measured according to the procedure described, supra.

The results are shown in Table I.

Control B 5.2 parts per million (ppm) of Cationic Polymer 1 was added to the aqueous slurry of taconite tailings, mixed, and then another 5.2 ppm of Cationic Polymer I was added to the slurry by the procedure described supra and the slurry tested as described, supra.

The results are shown in Table I.

EXAMPLE 1

5.2 ppm of Anionic Polymer 1 was added to the aqueous slurry of taconite tailings, mixed, and then another 5.2 ppm of Anionic Polymer 1 was added to the slurry by the procedure described supra and the slurry tested as described, supra.

The resuts are shown in Table I.

EXAMPLE 2

5.2 ppm of Anionic Polymer 2 was added to the aqueous slurry of taconite tailings, mixed, and then another 5.2 ppm of Anionic Polymer 2 was added to the slurry by the procedure described supra and the slurry tested as described, supra.

The results are shown in Table I.

Control C 4.9 ppm of Cationic Polymer 1 was added to the aqueous slurry of taconite tailings, mixed and then another 4.9 ppm of Cationic Polymer 1 was added to the slurry by the procedure described supra and the slurry tested as described, supra.

The results are shown in Table I.

EXAMPLE 3

4.9 ppm of Anionic Polymer 1 was added to the aqueous slurry of taconite tailings, mixed and then another 4.9 ppm of Anionic Polymer 1 was added to the slurry by the procedure described supra and the slurry tested as described, supra.

The results are shown in Table I.

Control D 6.5 ppm of Cationic Polymer 1 was added to the aqueous slurry of taconite tailing, mixed and then another 6.5 ppm of Cationic Polymer 1 was added to the slurry by the procedure described supra and the slurry tested as described, supra.

The results are shown in Table I.

EXAMPLE 4

6.5 ppm of Anionic Polymer 1 was added to the aqueous slurry of taconite tailing, mixed and then another 6.5 ppm of Anionic Polymer 1 was added to the slurry by the procedure described supra and the slurry tested as described, supra.

The results are shown in Table I.

EXAMPLE 5

6.5 ppm of Anionic Polymer 2 was added to the aqueous slurry of taconite tailing, mixed and then another 6.5 ppm of Anionic Polymer 2 was added to the slurry by the procedure described supra and the slurry tested as described, supra.

The results are shown in Table I.

EXAMPLE 6

6.5 ppm of Anionic Polymer 3 was added to the aqueous slurry of taconite tailing, mixed and then another 6.5 ppm of Anionic Polymer 3 was added to the slurry by the procedure described supra and the slurry tested as described, supra.

The results are shown in Table I.

Control E 2.5 ppm of Cationic Polymer 1 was added to the aqueous slurry of taconite tailing, mixed and then another 2.5 ppm of Cationic Polymer 1 was added to the slurry by the procedure described supra and the slurry tested as described, supra.

The results are shown in Table I.

EXAMPLE 7

2.5 ppm of Anionic polymer 3 was added to the aqueous slurry of taconite tailing, mixed and then another 2.5 ppm of Anionic Polymer 3 was added to the slurry by the procedure described supra and the slurry tested as described, supra.

The results are shown in Table I.

Control F 5.0 ppm of Cationic Polymer 1 was added to the aqueous slurry of taconite tailing, mixed and then another 5.0 ppm of Cationic Polymer 1 was added to the slurry by the procedure described supra and the slurry tested as described, supra.

The results are shown in Table I.

EXAMPLE 8

5.0 ppm of Anionic Polymer 3 was added to the aqueous slurry of taconite tailing, mixed and then another 5.0 ppm of Anionic Polymer 3 was added to the slurry by the procedure described supra and the slurry tested as described, supra.

The results are shown in Table I.

Control G 7.5 ppm of Cationic Polymer 1 was added to the aqueous slurry of taconite tailing, mixed and then another 7.5 ppm of Cationic Polymer 1 was added to the slurry by the procedure described supra and the slurry tested as described, supra.

The results are shown in Table I.

EXAMPLE 9

7.5 ppm of Anionic Polymer 3 was added to the aqueous slurry of taconite tailing, mixed and then another 7.5 ppm of Anionic Polymer 3 was added to the slurry by the procedure described supra and the slurry tested as described, supra.

The results are shown in Table I.

What is claimed is:

1. A process for flocculating taconite tailings which comprises:
   (a) forming a concentrated aqueous solution from a water-soluble, ter- or higher polymer of water-soluble monomers and hydrophobic monomer, which polymer has the following formula:

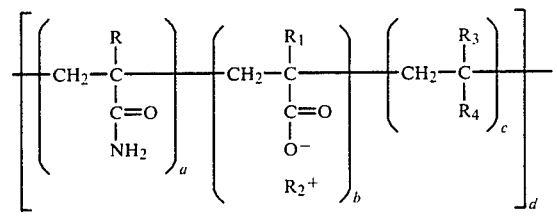

wherein:

R, $R_1$ and $R_3$ are independently hydrogen or methyl;

$R_2^+$ is an alkali metal ion;

$R_4$ is $OR_5$ where $R_5$ an alkyl group having up to 5 carbon atoms;

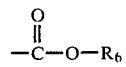

where $R_6$ is an alkyl group having up to 8 carbon atoms;

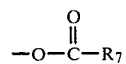

where $R_7$ is methyl, ethyl or butyl; phenyl; substituted phenyl; CN; or

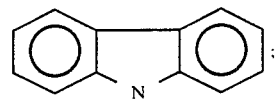

a is from 5 to about 90 mole percent;
b is from 5 to about 90 mole percent;
c is from about 0.2 to about 20 mole percent;
d is an integer of from about 1,000 to about 500,000;

TABLE I

| Example | Flocculant | Amount of Flocculant Added in first increment (ppm) | Amount of Flocculant Added in Second Increment (ppm) | $t_{70}$ (sec) | $T_5$ (%) | $S_5$ (%) |
| --- | --- | --- | --- | --- | --- | --- |
| Control A | — | — | — | 483 | 4 | 9.6 |
| Control B | Cationic Polymer 1 | 5.2 | 5.2 | 105 | 31 | 19.0 |
| 1 | Anionic Polymer 1 | 5.2 | 5.2 | 45 | 23 | 27.4 |
| 2 | Anionic Polymer 2 | 5.2 | 5.2 | 117 | 17 | 18.3 |
| Control C | Cationic Polymer 1 | 4.9 | 4.9 | 60 | 14 | 26.0 |
| 3 | Anionic Polymer 1 | 4.9 | 4.9 | 21 | 21 | 40.5 |
| Control D | Cationic Polymer 1 | 6.5 | 6.5 | 130 | 43 | 17.1 |
| 4 | Anionic Polymer 1 | 6.5 | 6.5 | 33 | 35 | 29.4 |
| 5 | Anionic Polymer 2 | 6.5 | 6.5 | 75 | 39 | 22.3 |
| 6 | Anionic Polymer 3 | 6.5 | 6.5 | 39 | 39 | 28.5 |
| Control E | Cationic Polymer 1 | 2.5 | 2.5 | 120 | 12 | 20.4 |
| 7 | Anionic Polymer 3 | 2.5 | 2.5 | 90 | 12 | 24.9 |
| Control F | Cationic Polymer 1 | 5.0 | 5.0 | 102 | 42 | 22.4 |
| 8 | Anionic Polymer 3 | 5.0 | 5.0 | 57 | 43 | 30.7 |
| Control G | Cationic Polymer 1 | 7.5 | 7.5 | 90 | 57 | 23.2 |
| 9 | Anionic Polymer 3 | 7.5 | 7.5 | 30 | 54 | 36.2 | as a water-in-oil emulsion;

(b) diluting said concentrated aqueous solution of ter- or higher polymer formed in step (a) with additional water;

(c) mixing the diluted solution of step (b) with taconite tailings under appropriate floc forming conditions; and (d) allowing the suspended solids to settle to form an essentially clear aqueous supernatant.

2. The process of claim 1 wherein:
a is from about 30 to about 60 mole percent;
b is from about 30 to about 60 mole percent; and
c is from about 1 to about 10 mole percent.

3. The process of claim 1 wherein the polymer is a tetrapolymer having the following formula:

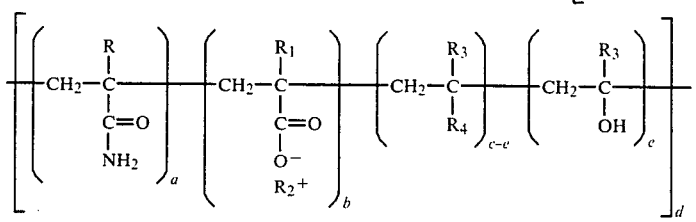

wherein R, $R_1$, $R_2^+$, $R_3$, $R_4$, a, b, c and d are as defined in claim 6 and e is between about 0.1 to 20 mole percent.

4. The process of claim 3 wherein:
a is from about 30 to about 60 mole percent;
b is from about 30 to about 60 mole percent; and
c is from about 0.1 to about 10 mole percent.

5. The process of claim 3 wherein the polymer is a tetrapolymer having the following formula:

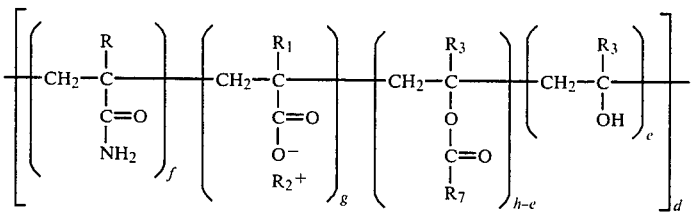

wherein:
R, $R_1$, $R_2^+$, $R_3$ and d are as defined in claim 6,
e is between about 0.1 to 20 mole percent;
f is from about 5 to about 90 mole percent;
g is from about 5 to about 90 mole percent; and h is from about 0.2 to about 20 mole percent.

6. The process of claim 5 wherein:
f is from about 30 to about 60 mole percent;
g is from about 30 to about 60 mole percent; and
h is from about 1 to about 10 mole percent.

7. The process of claim 1 wherein the polymer has the following formula:

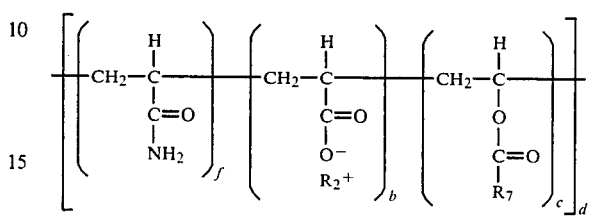

wherein:
$R_2^+$ is $Na^+$ or $K^+$;
$R_7$ is methyl, ethyl or butyl;
f is from about 5 to about 90 mole percent;
g is from about 5 to about 90 mole percent; and

h is from about 0.2 to about 20 mole percent.

8. The process of claim 7 wherein:
f is from about 30 to about 60 mole percent;
g is from about 30 to about 60 mole percent; and
h is from about 1 to about 10 mole percent.

* * * * *